United States Patent [19]

Igami et al.

[11] Patent Number: 5,761,710
[45] Date of Patent: Jun. 2, 1998

[54] INFORMATION APPARATUS WITH CACHE MEMORY FOR DATA AND DATA MANAGEMENT INFORMATION

[75] Inventors: Eiichi Igami, Katano; Shunji Kagamibashi; Yoshimitsu Nakamura, both of Neyagawa; Isao Obata, Nara; Takashi Imai, Katano, all of Japan

[73] Assignee: Matsushita Electric Industrial Co., Ltd., Osaka, Japan

[21] Appl. No.: 539,849

[22] Filed: Oct. 6, 1995

[30] Foreign Application Priority Data

| Oct. 7, 1994 | [JP] | Japan | 6-243797 |
| Mar. 14, 1995 | [JP] | Japan | 7-054426 |
| Oct. 5, 1995 | [JP] | Japan | 7-258435 |

[51] Int. Cl.⁶ .......................................... G06F 12/02
[52] U.S. Cl. ............................ 711/123; 711/129; 711/171; 711/173
[58] Field of Search ....................... 395/450, 470, 395/455, 403, 480, 123, 129, 171, 173; 364/DIG. 1

[56] References Cited

U.S. PATENT DOCUMENTS

| 4,719,568 | 1/1988 | Carrubba et al. | 395/450 |
| 4,899,275 | 2/1990 | Sachs et al. | 395/403 |
| 4,933,835 | 6/1990 | Sachs et al. | 395/450 |
| 4,992,977 | 2/1991 | Matoba et al. | 395/470 |
| 5,253,353 | 10/1993 | Mogul | 395/449 |
| 5,563,987 | 10/1996 | Scott | 395/115 |

FOREIGN PATENT DOCUMENTS

| 63-288342 | 11/1988 | Japan . |
| 2-254680 | 10/1990 | Japan . |
| 5-74046 | 3/1993 | Japan . |

Primary Examiner—Tod R. Swann
Assistant Examiner—J. Peikari
Attorney, Agent, or Firm—Ratner & Prestia

[57] ABSTRACT

An information recording/reproducing apparatus wherein the CPU stores data transferred through an interface in a temporary storage area and later records the data in a recording medium by using a recording/reproducing means. The temporary storage area is divided into first and a second regions by a temporary storage region disposition device. A discriminator determines whether the process-requested region is an information managing region or a data region from the process requests made by the host computer and the temporary storage region managing information. Based on the result of this discrimination, the temporary storage region manager allocates the first region if the data is for information managing or the second region if the data is intended for data storage.

21 Claims, 12 Drawing Sheets

| | TOP LBA | NUMBER OF STORED BLOCKS | CONTROL INFORMATION |
|---|---|---|---|
| REGION A | — | — | REPRODUCING/ RECORDING/ACCESS PATTERN DATA |
| REGION B | — | — | REPRODUCING/ RECORDING/ACCESS PATTERN DATA |
| REGION C | — | — | REPRODUCING/ RECORDING/ACCESS PATTERN DATA |
| REGION D | — | — | REPRODUCING/ RECORDING/ACCESS PATTERN DATA |

| PROCESS NO. | ACCESSED REGION | TOP LBA | BLOCK LENGTH |
|---|---|---|---|
| 1 | REGION 1 (1) | 100h | ↓ |
| 2 | REGION 2 (1) | 180h | ↓ |
| 3 | REGION 7 (1) | 5000h | 16 |
| 4 | REGION 4 | 3001h | 63 |
| 5 | REGION 3 | 3000h | ↓ |
| 6 | REGION 1 (2) | 100h | ↓ |
| 7 | REGION 2 (2) | 180h | ↓ |
| 8 | REGION 7 (2) | 5000h | 16 |
| 9 | REGION 6 | 3101h | 63 |
| 10 | REGION 5 | 3100h | ↓ |
| 11 | REGION 1 (3) | 100h | ↓ |
| 12 | REGION 2 (3) | 180h | ↓ |
| 13 | REGION 7 (3) | 5000h | 16 |

NOTE; NUMERALS WITHIN ( ) SHOWS AN ORDER OF ACCESSES MADE TO THE SAME REGION

FIG. 5

| PROCESS NO. | ACCESSED REGION | TRANSITION OF ALLOCATION OF TEMPORARY STORAGE REGIONS | | | |
|---|---|---|---|---|---|
| | | REGION A | REGION B | REGION C | REGION D |
| 1 | REGION 1 (1) ↓ | | | | REGION 1 (1) ↓ |
| 2 | REGION 2 (1) ↓ | | | | REGION 2 (1) ↓ |
| 3 | REGION 7 (1) ↓ | | | | REGION 7 (1) ↓ |
| 4 | REGION 4 ↓ | | | | REGION 4 ↓ |
| 5 | REGION 3 ↓ | | | | REGION 3 ↓ |
| 6 | REGION 1 (2) ↓ | REGION 1 (2) | | | ↓ |
| 7 | REGION 2 (2) ↓ | ↓ | REGION 2 (2) | | ↓ |
| 8 | REGION 7 (2) ↓ | ↓ | ↓ | REGION 7 (2) | ↓ |
| 9 | REGION 6 ↓ | ↓ | ↓ | ↓ | REGION 6 ↓ |
| 10 | REGION 5 ↓ | ↓ | ↓ | ↓ | REGION 5 ↓ |
| 11 | REGION 1 (3) ↓ | REGION 1 (3) | ↓ | ↓ | ↓ |
| 12 | REGION 2 (3) ↓ | ↓ | REGION 2 (3) | ↓ | ↓ |
| 13 | REGION 7 (3) | ↓ | ↓ | REGION 7 (3) | ↓ |

NOTE: NUMERALS WITHIN ( ) SHOWS AN ORDER OF ACCESSES MADE TO A SAME REGION

FIG. 6

| REGION | TOP ADDRESS | NUMBER OF SECTORS | ALLOCATED REGION ON RECORDING MEDIUM |
|---|---|---|---|
| A | 00000h | 32 | LBA=00 ~ 31 |
| B | 04000h | 32 | LBA=32 ~ 63 |
| C | 08000h | 192 | OTHER REGIONS THAN |

FIG. 8

| SET MODE | REGION A | REGION B | REGION C |
|---|---|---|---|
| DOS | LBA=0~63 | LBA=64~95 | LBA=96~ |
| MACINTOSH | LBA=0~31 | LBA=2048~2111 | LBA=32~2020<br>LBA=2112~ |
| UNIX | LBA=0~63 | LBA=4096~4159 | LBA=64~4095<br>LBA=4160~ |

FIG. 10

| PROCESS NO. | ACCESSED REGION | TRANSITION OF ALLOCATION OF TEMPOROARY STORAGE REGIONS | | | |
|---|---|---|---|---|---|
| | | REGION A | REGION B | REGION C | REGION D |
| 1 | REGION 1 (1) | REGION 1 (1) | | | |
| 2 | REGION 2 (1) | | REGION 2 (1) | | |
| 3 | REGION 7 (1) | | | REGION 7 (1) | |
| 4 | REGION 4 | | | | REGION 4 |
| 5 | REGION 3 | REGION 3 | | | |
| 6 | REGION 1 (2) | | REGION 1 (2) | | |
| 7 | REGION 2 (2) | | | REGION 2 (2) | |
| 8 | REGION 7 (2) | | | | REGION 7 (2) |
| 9 | REGION 6 | REGION 6 | | | |
| 10 | REGION 5 | | REGION 5 | | |
| 11 | REGION 1 (3) | | | REGION 1 (3) | |
| 12 | REGION 2 (3) | | | | REGION 2 (3) |
| 13 | REGION 7 (3) | REGION 7 (3) | | | |

NOTE; NUMERALS WITHIN ( ) SHOWS AN ORDER OF ACCESSES MADE TO A SAME REGION

INFORMATION APPARATUS WITH CACHE MEMORY FOR DATA AND DATA MANAGEMENT INFORMATION

FIELD OF THE INVENTION

This invention relates to an information recording/ reproducing apparatus provided with a temporary memory having plural regions. One of the regions which is accessible as an information management region while an other region is accessible as a data region provided on a disk realizing highspeed access to the disk.

BACKGROUND OF THE INVENTION

Employments of various applications and information and data of very high capacity are now very popular in the information service industry. Developments of recording/ reproducing apparatuses having higher capacities are now essential. Among various recently developed information recording/reproducing apparatuses, the optical diskapparatus employing interchangeable high memory capacity media are now considered as the most appropriate apparatus to meet these demands.

However, comparing the optical disk apparatus with a magnetic disk apparatus, the former, employing a non-contact recording/reproducing principle, is disadvantageous over the magnetic disk apparatus, because the higher rotating speed required by the former is hard to obtain.

Moreover, since the optical disk apparatus constantly suffers from dust or inherent defects in the medium, a step for verification has to be provided during recording in order to secure interchangeability with other recording/ reproducing media. Thus, the optical disk apparatus is disadvantageous over the magnetic disk apparatus.

Therefore, in order to compensate for such disadvantages, the optical disk apparatus provides various means such as: 1) a read-ahead read cache preparing for upcoming access by reading data from more than the required blocks into a data buffer; 2) a write cache reporting the end of the command at the completion of data recording in the data buffer during recording or; 3) a multi-page cache dividing the data buffer into plural pages of different regions realizing storage of data in the plural temporary storage regions.

Among these means, the multi-page cache is highly effective in improving the performance of an optical disk apparatus since data stored in region-1, for example, remains in the buffer even if an access to another region-2 is made after the access to region-1 is made. The data left in the buffer can be read-out if region-1 is reaccessed by a read command, while the data left in the buffer would be destroyed if the command is a write command producing no extra accesses.

The construction of a conventional optical disk apparatus provided with a multi-page cache is explained below by referring to the attached drawings.

FIG. 12 shows a block diagram of a conventional optical disk apparatus, wherein the data transferred from a host computer through interface 123 are stored in temporary storage means 126, and are recorded on a specified region of recording medium (optical disk) 124 by the instructions of CPU 120 given to recording/reproducing means 125. On the other hand, the data recorded on recording medium 124 can be reproduced and stored in temporary storage means 126 and are transferred to the host computer through interface 123 when CPU 120 gives instructions to recording/ reproducing means 125.

2

Temporary storage means 126 is divided into plural regions such as regions-A, -B, -C and -D shown in FIG. 13 by means of temporary storage region disposition means 121. The temporary storage region managing means 122 allocates each of the regions of temporary storage means 126 in an order requested by the host computer.

The operations of a thus constructed conventional optical disk apparatus are now explained below by referring to FIG. 2 showing an arrangement of regions in which information data on the recording medium are recorded. In FIG. 2, the file data, as a file substance to be accessed by the host computer, are disposed in regions-3, -4, -5, and -6, the management of information in the file data are disposed in region-7, and the file managing information showing the locations and connections of the file data are disposed in regions-1 and -2.

When recordings are made by the host computer in the above-shown file disposed on recording medium 124 in the order shown in FIG. 5, the transition of the storage regions of temporary storage means 126 takes place as shown in FIG. 14. As shown in FIG. 14, since rewriting operations on recording medium 124 have to be carried out on every time the recording region of recording medium 124 allocated to the storage region of the temporary storage region is replaced, frequent access operations have to occur between the managing information region and the data region.

With the above-shown conventional circuit construction, however, the temporary storage means has to be divided into regions of equal capacity since each page of the temporary storage means is equally responsible. Therefore, frequent page switching operations are inevitable since the temporary storage means consists of a small number of pages, each having a large capacity, so that the chances of retrieving the data stored in an essential page by a later access would be high.

In addition to this, when the temporary storage means consists of a large number of small capacity pages, the processing period making an access to the region storing required data would be excessively long. Moreover, since the quantity of memory pages allocated to the managing information is much less than the quantity of memory pages storing the data information, the overall utility efficiency of the temporary storage means would be very low.

The present invention solves these problems by making an efficient use of the storage capacity of the temporary storage means and offers an information recording/ reproducing apparatus capable of making an access to the recording medium in a minimum processing time even when an alternative access is made to the managing information and data regions which are disposed at a reasonably separated distance on the recording medium.

SUMMARY OF THE INVENTION

In order to attain these objectives of the invention, a first information recording/reproducing apparatus of the invention comprises:

a recording medium recording and reproducing information in a unit of a specified block;

a recording/reproducing means for recording information on said recording medium and for reproducing information from said recording medium;

an interface means to a host apparatus;

a temporary storage means for temporarily storing data being exchanged with said host apparatus in performing recording and reproducing of said recording medium;

a temporary storage region disposition means dividing said temporary storage means into at least two regions;

a temporary storage region managing means using said divided regions individually as one of a management information region and a data region; and a discriminating means determining a correspondence of the block to be processed to said data region constituting a main file of said recording medium or to said managing information region showing the locations and connections of said data region on the bases of processes requested from a host apparatus, temporary storage managing information showing a utilization of an individual region of said temporary storage means, and allocating information of said temporary storage regions;

Wherein said temporary storage region managing means allocates one of a managing information region of said temporary storage means if the result of the discrimination shows a managing information region and allocates a data region if the result of the discrimination shows a data region.

A second information recording/reproducing apparatus of the invention comprises:

a recording medium recording and reproducing information in a unit of a specified block;

a recording/reproducing means for recording information on said recording medium and for reproducing information from said recording medium;

an interface means to a host apparatus;

a temporary storage means for temporarily storing data being exchanged with said host apparatus in performing recording and reproducing of said recording medium;

a temporary storage region disposition means dividing said temporary storage means into at least two regions; and a temporary storage region managing means using said divided regions individually as one of a managing information region and a data region;

wherein one or more regions included in said temporary storage means are allocated only to a specified region of said recording medium.

In said first information recording/reproducing apparatus of the invention, said temporary storage region disposition means divides said temporary storage means or provides plural temporary storage means allowing plural accesses of at least more than two to those regions, and the regions are disposed as a managing information region and a data region.

Moreover, said discriminating means determines a correspondence of a block to be processed to said data region constituting the main file of said recording medium or to said managing information region showing the locations and connections of said data region on the bases of processes requested from the host equipment and temporary storage management information showing the utilizations of individual regions of said temporary storage means. If said discrimination means recognizes as the block management information, a management information region of said temporary storage means is allocated, and a data region is allocated if said discrimination means recognizes as the block data.

In said second information recording/reproducing apparatus of the invention, said temporary storage region disposition means allocates only one region or more than one region of the temporary storage means to access a specified region of recording medium.

Thus, the access in said apparatus can be made in a minimum processing period by making full use of the functions of the present invention, including the effective utilization of the temporary storage means matched to various host apparatuses and the reduction of the number of accesses made to the managing information region and the data regions.

BRIEF EXPLANATION OF THE DRAWINGS

FIG. 5 shows an order of accesses received from said host computer in said example.

FIG. 6 shows transitions of said order of accesses and said allocation of temporary storage regions in said example

FIG. 8 shows an example of said temporary storage region managing information of said temporary storage means.

FIG. 10 shows a diagram showing automatic allocation of said temporary storage regions.

FIG. 14 shows transitions of the order of accesses and the allocation of temporary storage regions shown in said conventional example.

DETAILED DESCRIPTION OF THE PREFERRED EMBODIMENTS

Two of the preferred embodiments of the invention are now explained below by referring to the attached drawings.

THE FIRST EMBODIMENT

Figure 1:
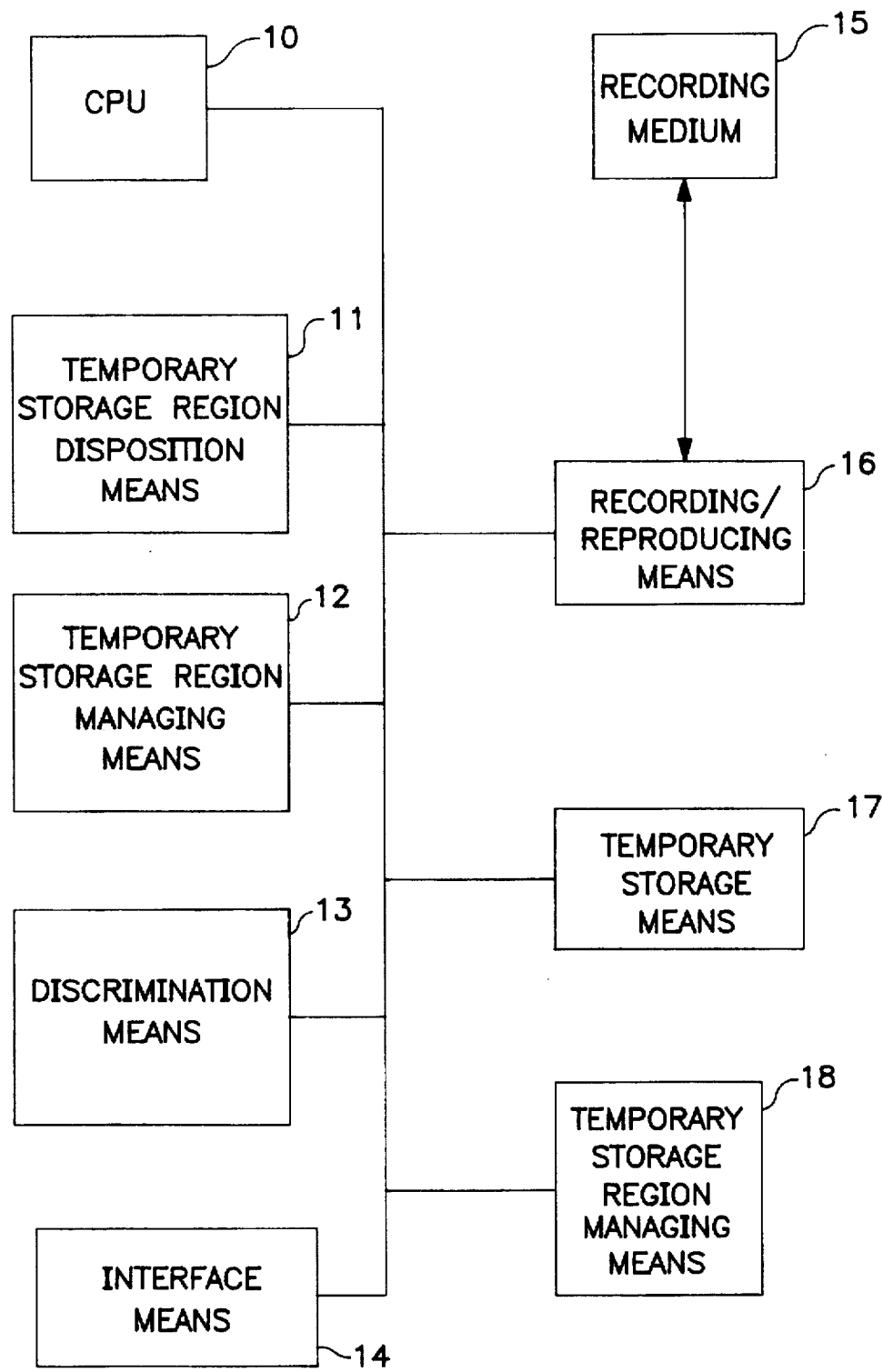
FIG. 1 shows a block diagram of an information recording/reproducing apparatus which is a first embodiment of the invention.

A first embodiment of the invention is now explained below by referring to FIG. 1 showing a block diagram of the invented optical disk apparatus. In FIG. 1, CPU 10 gives instructions to recording/reproducing apparatus 16, and by these instructions, the data transferred from a host computer through interface 14 are recorded on a specified region of recording medium 15 after the data are stored once in temporary storage means 17. On the other hand, the data reproduced on recording medium 15 and stored in temporary storage means 17 can be transfererd to a host computer by giving instructions to recording/reproducing apparatus 16.

Figures 3, 4:
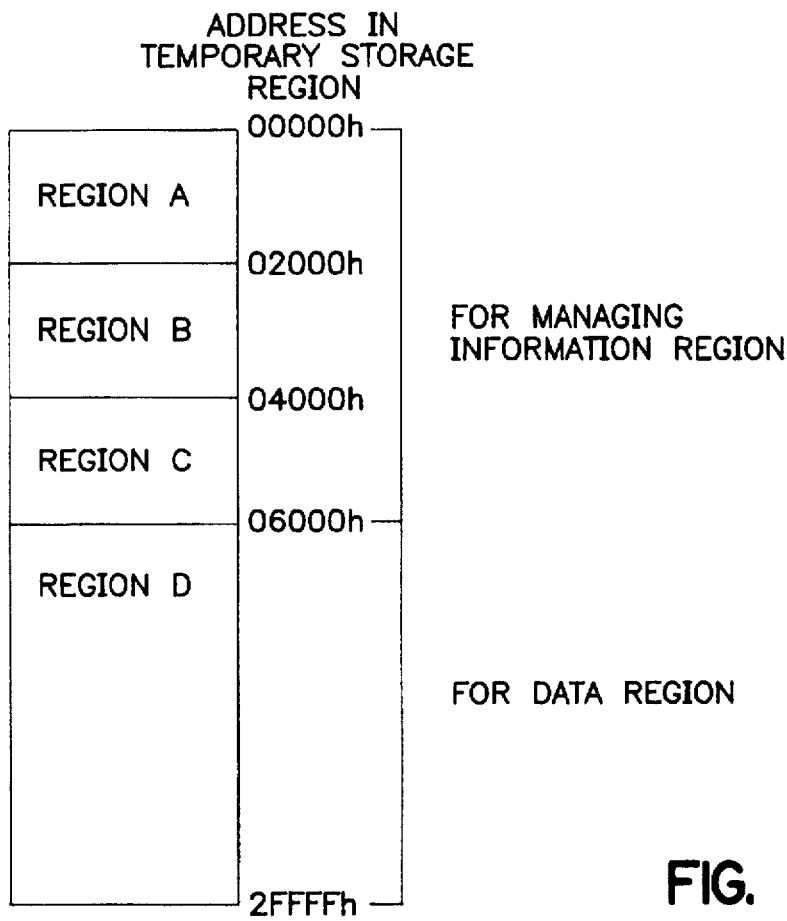
FIG. 3 shows a disposition of regions of the temporary storage means.
FIG. 4 shows an example of said temporary storage region managing information.

In this case, said temporary storage means 17 is divided into plural regions by utilizing the temporary storage region disposition means as shown in FIG. 3, and region-A, -B and -C are used as a managing information region, and region-D is used as a data region. On the other hand, temporary storage region managing means 12 manages the allocation of regions of temporary storage means 17 under a process request made by the host computer. Meanwhile, the temporary storage region managing means 12 stores the present states of the allocation of temporary storage means 17 into a temporary storage region managing information 18.

Said temporary storage region managing information 18 has a construction as shown in FIG. 4, and consists of a top logical block address (hereinafter the logical block address is abbreviated as LBA), number of the stored block, and a control information, corresponding to the divided region of the temporary storage means 17. The logical block is a unit of process request made by a host apparatus, and this is defined by the Small Computer System interface (SCSI) standard.

Moreover, said control information includes information indicating whether said stored data is reproduced data, record requesting data, or invalid data, and information indicating whether the access pattern to each of said temporary storage regions has an access pattern which is spatially and timewise continuous to one region or not.

The discriminating means 13 determines the number of blocks of processing which are requested by the host computer. If the number is less than a predetermined number (16 blocks, e.g.) and if the difference between the top LBA of storing data of region-D of the temporary storage region managing information and the maximum LBA of the process requested region is larger than a determined value (32 blocks, e.g.), then it is recognized as a managing information region.

If the difference between the top LBA of the storing data of region-D of the temporary storage region managing information and the maximum LBA of the process requested region would be negative, zero, or positive, provided that the positive is less than a predetermined value (32 blocks, e.g.), it is recognized as a data region. If the difference is more than a predetermined value (128 blocks, e.g.), it is recognized as a managing information region.

These results are reported to the temporary storage region managing means 12. If the recognition is a managing information region, temporary storage region managing means 12 allocates regions-A, -B, or -C of the temporary storage means 17, and if it is a data region, temporary storage region managing means 12 allocates region-D of the temporary storage means 17.

Figure 2:
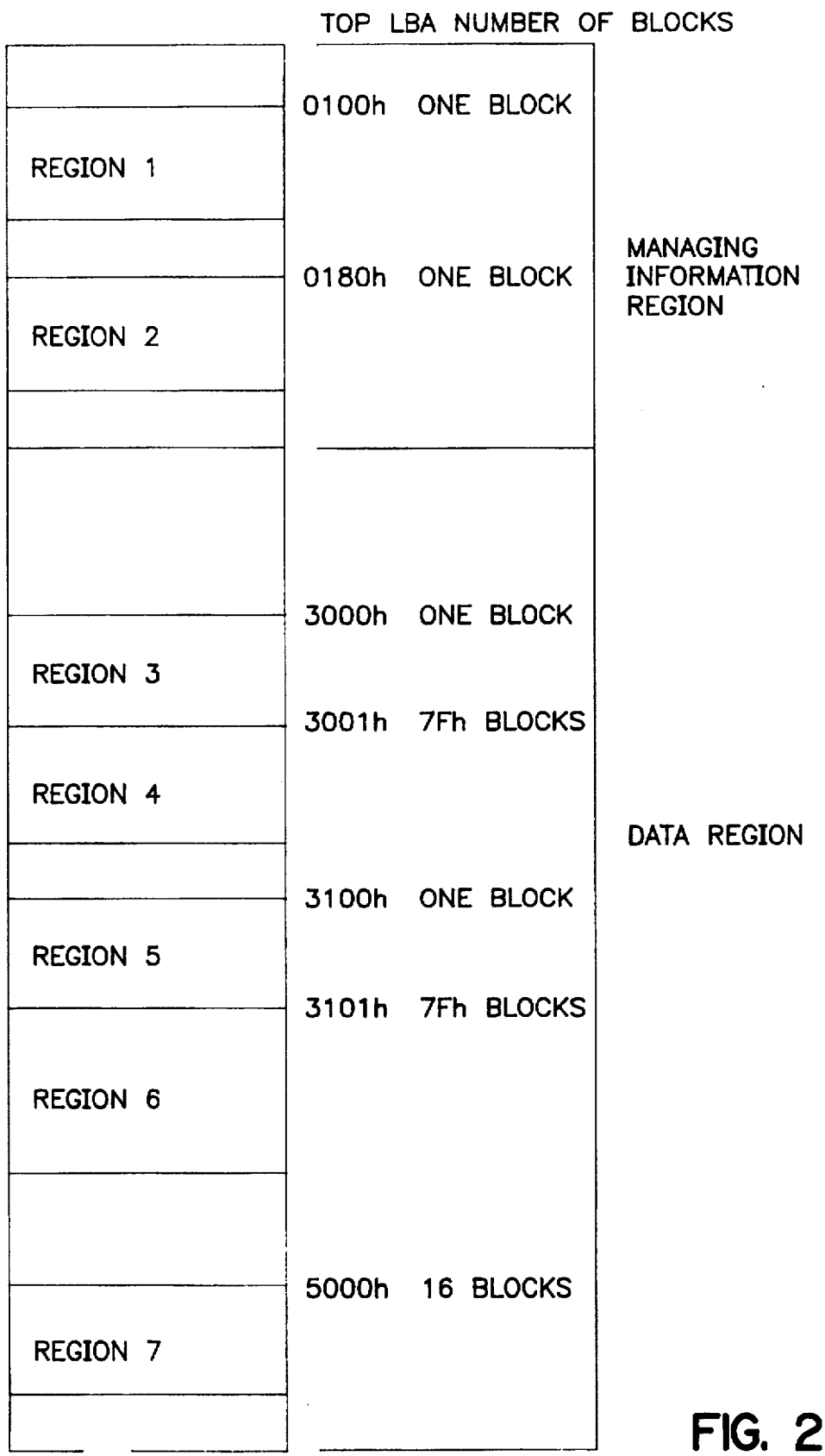
FIG. 2 shows a disposition of file data on said recording medium.

Thus, the above-constructed information recording/reproducing apparatus of the present embodiment is provided with regions-3, -4, -5 and -6 acting as data regions on recording medium 15, is provided further with region-7 acting as a managing region within the file data region, and is provided further with region-1 and region-2 acting as managing information as shown in FIG. 2. Then, writing operations performed by a host computer in an order shown in FIG. 5 in a unit of block length as shown in FIG. 5 are now explained below by referring to FIG. 6.

(Process number-1)

Since stored data is not kept in region-D for a one block record process request made to region-1, region-D is kept at an initial condition, then the top LBA of storing data is zero. Thus, the value of the top LBA of region-1 is larger than zero at which the top LBA of the storing data of region-D, and the top LBA of region-1 is recognized as a data region, and this result is reported to temporary storage region managing means 12. Based on this, temporary storage region managing means 12 allocates region -D to this data.

(Process Number-2)

The value of the top LBA of storing data of region-D for the record process of one block requested to region-1 is 0100h. Since this is less than the value of 0180h of the top LBA of region-2, this is recognized as a data region by discrimination means 13, and this result is reported to temporary storage region managing means 12, and is allocated to region-D (Process Number-3)

Then, since the top LBA of storing data of region-D is 0180h for the recording process request of 16 blocks made to region-7, and this is smaller than the top LBA 5000h of region-7, this is recognized as a data region by discrimination means 13. Thus, this result is reported to the temporary storage region managing means 12, and is allocated to region-D.

(Process Number-4)

As for the recording process request of 7Fh blocks made to region-4, since the number of recording process requested blocks is larger than 16, this is recognized as a data region by discrimination means 13 and temporary storage region managing means 12 receiving this report allocates region-4 to region-D.

(Process Number-5)

As for the recording process request of one block made to region-3, although the number of recording process requested blocks is only one, since the difference between the top LBA of storing data of region-D which is 3001h and the recording process requested LBA which is 3000h, is only one (which is far less than 32), this is recognized as a data region by discrimination means 13, and the temporary storage region managing means 12 receiving this result allocates region-3 to region-D. Furthermore, the fact that this is recognized as a continuous access made to region-D, is established in the control information (Process Number-6)

As for the second recording process request of one block made to region-1, since the top LBA of storing data of region-D is 3000h this produces a difference of 2F00h when compared to the maximum LBA of region-1 which is 100h. Since this is larger than 32, this is recognized as a managing information region by discrimination means 13, and the temporary storage region managing means 12 to which the result is reported, allocates region-1 to region-A.

(Process Number-7)

The second recording process request of one block made to region-1 is processed similarly, and the temporary storage region managing means 12 is allocated to region-B.

(Process Number-8)

Next, as for the recording process request of 16 blocks made to region-7, the top LBA of storing data of region-D is 3000h making a negative difference when compared to the top LBA of storing data of region-7 which is 5000h. However, since region-D is recognized as being continuously accessed, this is recognized as a managing information region by discrimination means 13, and this result is reported to the temporary storage region managing means 12 and is allocated to region-C. Furthermore, since the continuous access to region-D is recognized as being interrupted, the interruption of continuous access is established in the control information.

(Process Number-9)

As for the recording process request of 7Fh block made to region-6, since the number of recording request blocks is larger than 16, this is recognized as a data region by discrimination means 13, and temporary storage region managing means 12 to which the result is reported allocates region-6 to region-D.

Likewise, these similar operations are repeated thereafter so that the allocations of temporary storage means 17 are transitioned as shown in FIG. 6. Likewise, once the data in the data region is stored in region-D of the temporary storage means, region-A, region-B or region-C is allocated thereafter for an access of one block of the managing information region.

Therefore, since this means that the data region is processed in region-D of temporary storage means 17 and the managing information region is processed in region-A, -B, or -C, this means that a substantial reduction in the number of unnecessarily accesses made between the managing information region and the data region is possible. Moreover, since the number of recording processes can also be reduced by applying a write-back algorithm reporting the completion of a normal process to the host-computer at the completion of transfer of recording data, a higher processing speed can be obtained.

In this case, the number of storing blocks of temporary storage region managing information 18 in the predetermined region is determined at the completion of recording data transfer, and the control information is established in the recording request data at the same time. After these, CPU 10 drives recording/reproducing means 16 in order to record the record requesting data in recording medium 15 referring to said temporary storage region managing information 18.

In this embodiment of the invention, an example where the managing information region is disposed in a small region within the LBA, and is less than a predetermined number of access request blocks, and an example where it is separated from the continuously accessible region by a predetermined number of blocks and is less than a predetermined number of access request blocks at the same time, have been shown.

However, if the address information could be available in advance from the host computer utilizing a mode parameter such as the one specified by the SCSI interface standard or a read command having a zero transfer length, both the starting LBA and the ending LBA of the managing information region could be recognized, and the managing information region of the temporary storage means could be allocated for a region limited by the above.

In addition to these, although the initial value of top LBA of storing data in region-D is assumed to be zero in this embodiment, by selecting a proper initial value (400h e.g.), the process could be allocated to any of the region-A, -B, or C starting from the first one-block processing request made to the managing information region.

Beside, the operating system is usually provided with a particular managing information region on the recording medium, and this region is accessed often at the time of data readout or recording. For example, in the case of DOS consisted of a system reservation region, DOS managing information region such as a file allocation table and a root directory, and a user directory starting from LBA0, the DOS managing information region is accessed often when the file is written or readout. However, only several blocks are accessed at most even when an entire file has to be processed.

Moreover, since the access to the managing information region is performed in a small unit of one block in most of the cases, small and plural regions are suitable to be used as the temporary storage region for the managing information region, while the allocation of high capacity to the data section is desirable in dealing with regions of long length. Furthermore, since this invention takes a construction enabling the discrimination of the request region falls in a managing information region or a data region according to the request from the host apparatus, this has a versatility higher than that of the method recognizing the managing information region as a fixed region. This is especially effective in the cases where the recording medium is divided into plural partitions and that the recording medium has the managing information region within the data region.

THE SECOND EMBODIMENT

Figure 7:
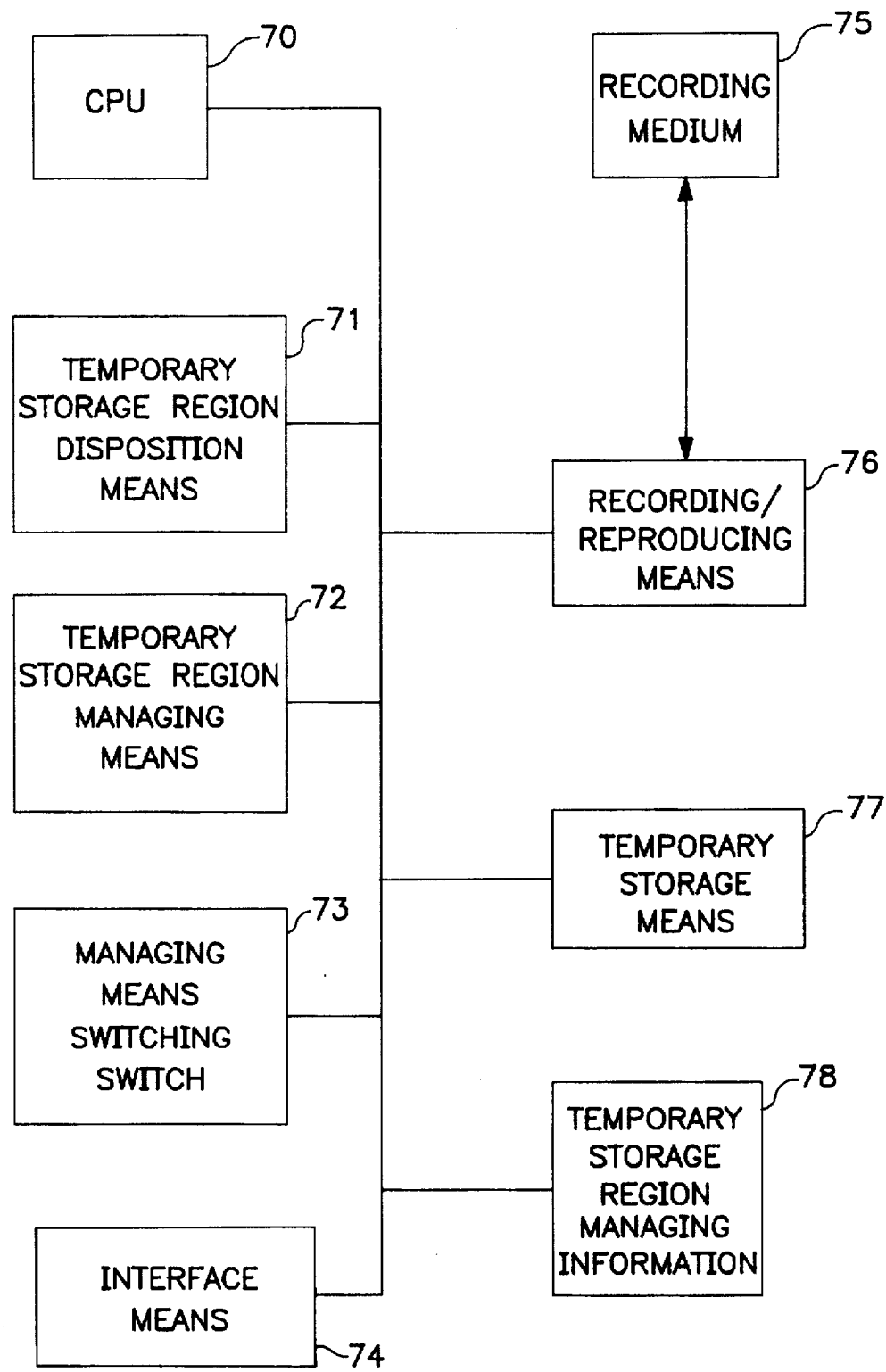
FIG. 7 shows a block diagram of an information recording/reproducing apparatus which is a second embodiment of the invention.

A second embodiment of the information recording/reproducing apparatus of the invention is now explained below. FIG. 7 shows a block diagram of the information recording/reproducing apparatus. In FIG. 7, CPU 70 records the data transferred from a host computer through interface 74 on a specified region of recording medium 75 through temporary storage means 77 by giving an instruction to recording/reproducing means 76.

On the other hand, CPU 70 reproduces data recorded on recording medium 75, stores the data in temporary storage means 77, and transfers the data to the host computer through interface 74 by giving an instruction to recording/reproducing means 76.

In this case, temporary storage means 77 is divided by temporary storage region disposition means 71 obeying the instructions of temporary storage region managing information 78, so that the regions of temporary storage means 77 used according to the accessed region on recording medium 75 are determined by temporary storage region managing means 72.

Moreover, the instruction specified by the temporary storage region managing information 78 can be changed by management means switching switch 73 according to the user environment. The setting of management means switching switch 73 is made by either the host apparatus through the interface or a physical means provided in the apparatus.

Figure 9:
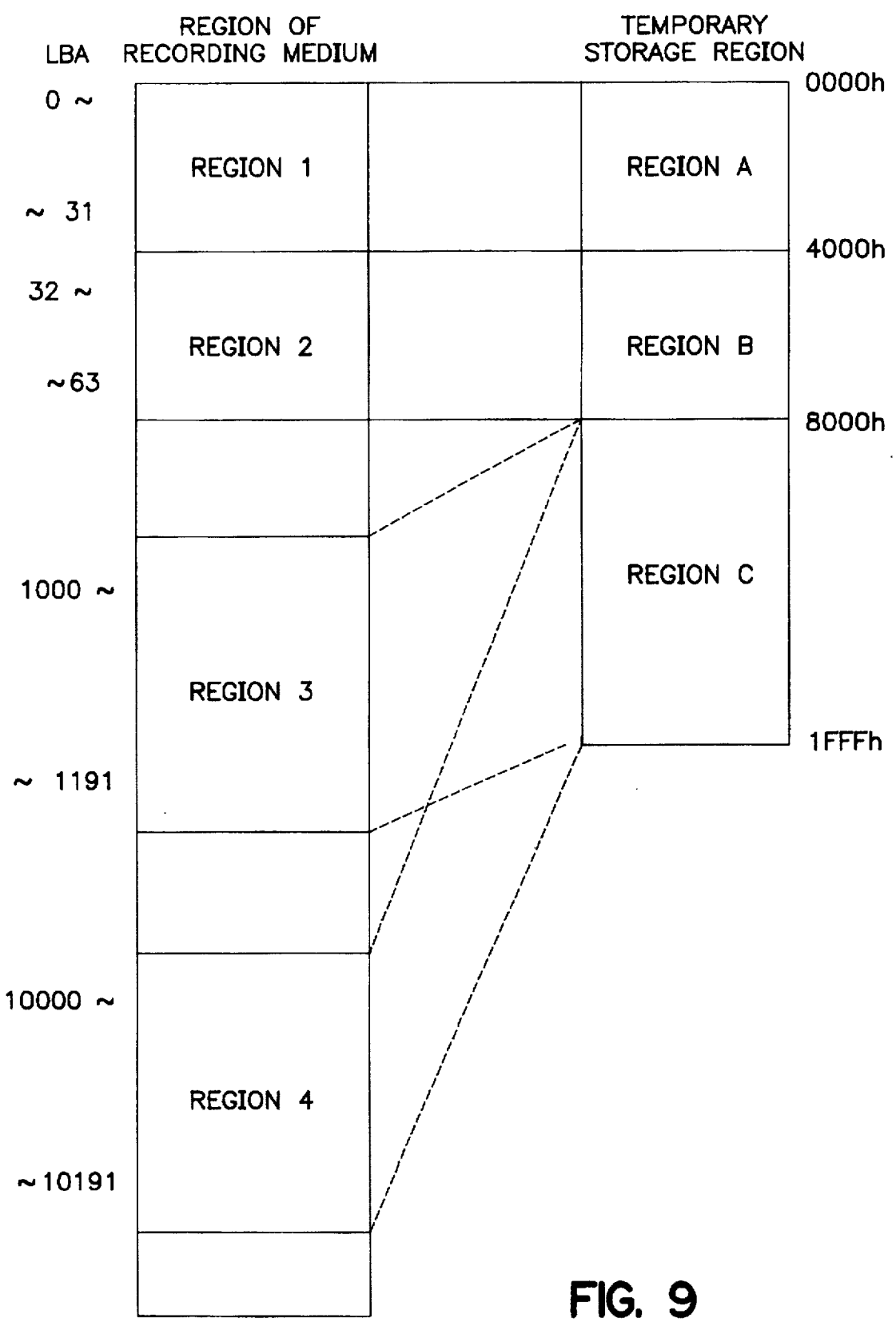
FIG. 9 shows an allocation of said temporary storage regions.

The division and allocation of the temporary storage means of the above-constructed information recording/reproducing apparatus using the temporary storage region managing information 78 are now explained by referring FIGS. 8 and 9.

FIG. 8 show a construction of temporary storage region managing information 78 indicating the top addresses on the temporary storage region, numbers of sectors, and regions allocated on the recording medium to each of the divided regions. These are disposed on the temporary storage region and are accessible by CPU, and the allocations of these are conducted on the bases of temporary region managing information 78.

In a case shown in FIG. 8, the regions from the top of the temporary storage region to address 3FFFh (region-A) are a first fixed region and the accesses to the corresponding regions LBA=0–31 on the recording medium are inevitably made through these regions. Then, the addresses from 4000h to 7FFFh of the temporary storage region (region-B) are a second fixed region, and the accesses to the corresponding regions LBA=32–63 on the recording medium are inevitably made through these regions. The remaining temporary storage region on and after address 8000h (region-C) are used to make accesses to the regions on and after LBA=64 on the recording medium.

FIG. 9 is a temporary storage region managing information shown in FIG. 8 expressed in terms of the addresses on the actual temporary storage means and recording medium. Since regions-A and -B are permanently allocated to regions-1 and -2 of the recording medium, region-A of the temporary storage means would be used if an access to LBA=2 included in region-1 were conducted. However, no data stored within the other regions-B and -C would be destroyed, so that only one region on the temporary storage means would be available in making an access to such regions.

On the other hand, when an access is made to the regions on and after LBA=64 of the recording medium, any proper regions on and after address 8000h of the temporary storage region can be used. Thus, region-3 would be allocated to on and after address 8000h of the temporary storage region in making an access to LBA=1000, and region-4 shall be allocated to on and after address 8000h of the temporary storage region in making an access to LBA=10000.

Then, the alternation and the automatic switching of temporary storage region managing information using the managing means switching switch are now explained below by referring to FIG. 10.

Since the extent of each region, allocation, and the number of regions of temporary storage region managing information are disposed in a temporary storage means managed by the CPU, these can be set by using a SCSI command made through an interface of the host apparatus by making a correspondence to the mode pages defined by one of the general purpose interfaces such as the SCSI interface standard.

In this case, since the actual temporary storage means would be operated on the setting of itself, the role of the temporary storage means can be altered similarly to a case assuming a host equipment. For example, accesses of high efficiency, wasting no data stored in the temporary storage region, can be obtained by changing the region specified before as a managing region of a directory or file by a host operating system into a fixed region.

These setting can be made arbitrarily by the host apparatus as mentioned before, and at the same time, a means to select a setting from several predetermined setting is provided. These are automatic switching functions of temporary storage region managing information operated by managing means switching switch 73.

The managing means switching switch 73 can also be set by a physical means such as a dip switch provided on the apparatus so that any of the various modes corresponding to Mcintosh, DOS, UNIX or other operating system can be provided by operating the switch, and the setting necessary to each of these operating systems can be automatically performed. In addition to this, a means to alter the content of the temporary storage region managing information 78 of temporary storage means 77 to a predetermined value suitable for the employed operating system is also provided.

FIG. 10 shows an example of this. If the provided mode is MS-DOS, addresses of LBA=0-63 are allocated correspondently to region-A, and the addresses on and after LBA=64 are allocated to region-B. Moreover, other than a physical switch, managing means switching switch 73 can be replaced by providing settable bits on the temporary storage means 77 controlled by CPU 70 and by switching performed by the operation of these.

Figure 11:
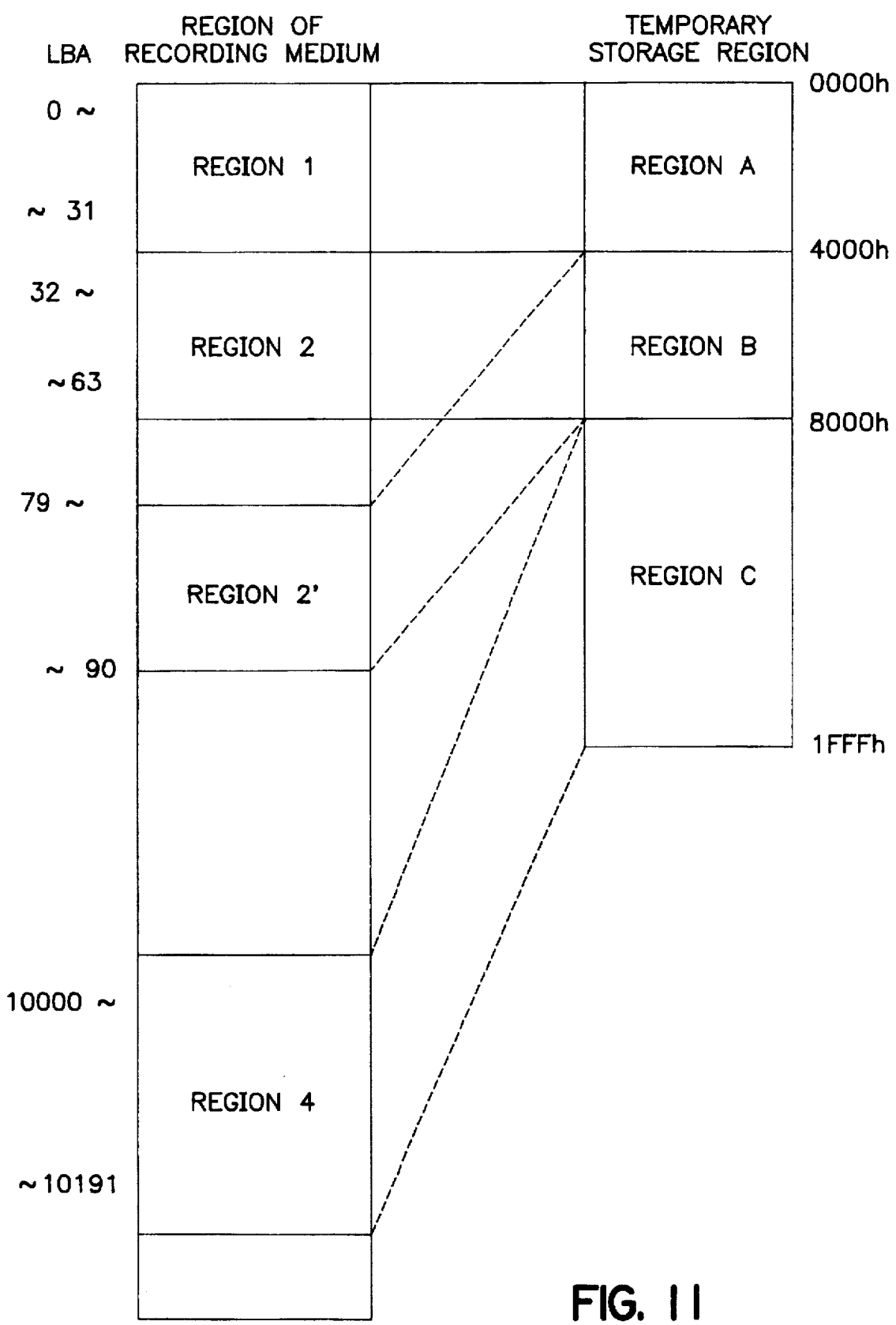
FIG. 11 is an example of altered allocations of said temporary storage regions.
Figure 12:
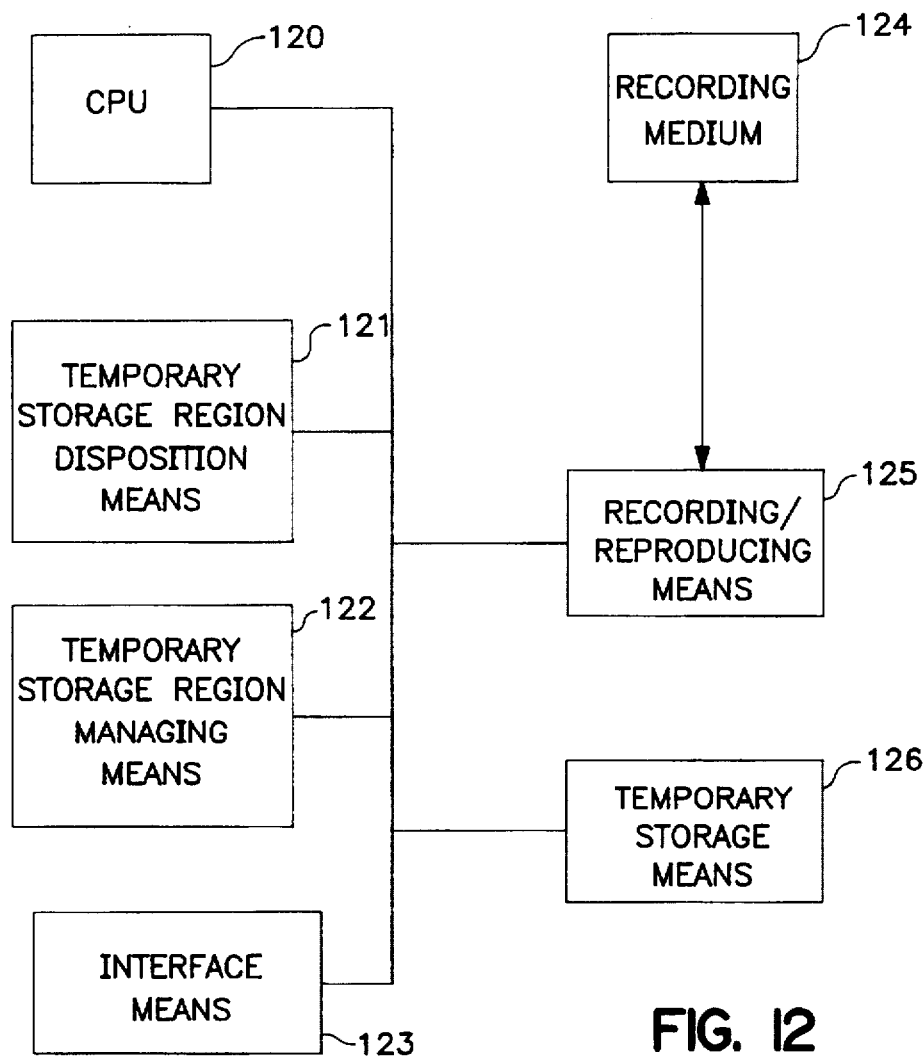
FIG. 12 shows a block diagram of a conventional information recording/reproducing apparatus.
Figure 13:
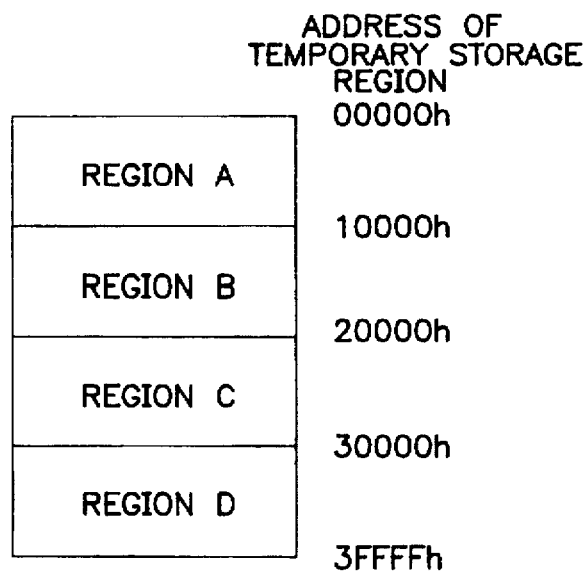
FIG. 13 shows a disposition of regions of a conventional temporary storage means.

An automatic correction function of the temporary storage region managing information is now explained below by referring FIGS. 9 and 11.

In the above-shown example, the division of temporary storage means 77 is performed on the bases of established temporary storage region managing information 78 allowing the accesses to recording medium 75. However, in a case where the number of accesses made to the fixed region is less than the predetermined number (several times e.g.) while the number of accesses made to the regions other than said fixed region is more than the predetermined number (several scores times e.g.), temporary storage region disposition means 71 would substitute the fixed region with a region other than the fixed region by referring the information of the temporary storage region managing information 78.

Moreover, in order to deal with a case where the positions of addresses on the recording medium corresponding to the fixed region are dislocated, a provision of enlarged capacity of the fixed region of temporary storage means 77 or enlarged allocated region of fixed region are possible. For example, assuming a case where no access is made to LBA=32-63 while accesses of more than a predetermined number are made to LBA=79-90 after a temporary storage region is allocated as shown in FIG. 9, the allocation of the temporary storage region is changed as shown in FIG. 11.

Although a case where the temporary storage region managing information is updated by a comparison of the number of accesses to the fixed region with a predetermined numbers is shown in the above-shown example, the alternation of temporary storage region managing information is possible by comparing the ratio of the total number of accesses to the number of accesses made to the fixed region with a predetermined number.

Moreover, though the temporary storage means used in Embodiments-1 and -2 have been explained as a temporary storage means divided into plural regions, it is also possible using a temporary storage means for only one region while using plural temporary storage means in order to perform as plural temporary storage regions.

The object of this is, for example, to satisfy the conditions of a case where the information managing region dealing with a small volume of data is required to perform a high-speed processing and the data region dealing with a large volume data is not required to perform a high-speed processing.

By the proper usage of a memory device as a temporary storage means according to the demands such as shown-above, a cost-wise advantage and an optimized efficiency can be obtained. Advantages may also be obtained when a memory device dedicated only for the data region is combined with another dedicated memory device divided into plural temporary storage regions and are used as an information managing region.

Moreover, when one region among plurally divided regions of the temporary storage means or one of the plural temporary storage means is used as a region, plural temporary storage managing means may possibly be used for correspondingly each of said plural temporary storage region, which is different from the above-explained example.

Furthermore, the temporary storage means mentioned here does not necessarily mean a particular hardware characteristics but means that a usage of said means similar to that of temporary storage, so that a permanent memory device such as a hard-disk or flash memory could be used as well.

Moreover, the object of the present invention is not only directed to the usage of a divided temporary storage region, but to apparatuses operable at higher speed by introducing a proper cache algorithm such as a read-ahead cache, write-back or others.

By employing a read-ahead cache, a predetermined region continuous to the managing information region accessed primarily is provided in the temporary storage region, so that the frequent accesses expectable to the managing information region can be performed at high-speed.

Furthermore, by applying a write-back algorithm, the frequent recording operations expected to a same region of the managing information region can be performed in a batch, so that the service life of the recording medium, such as the phase-transition type recording medium of which frequency of expected rewriting operations would be relatively small, could be extended. In addition to these, a number of secondary effects including low energy consumption, heat generation, and noise, and long service life are also expected by utilizing said temporary storage means.

In these cases, temporary storage means 77 is not necessarily limited within various semiconductor, magnetic, and optical memories but any memory medium performing the functions of temporary memory at a period less than the actual recording period, such as an optical disk of high memory capacity, or any memories having a memory capacity larger than the volume of information usually transferred at one time from a host computer may well be used.

Moreover, in these embodiments of the invention, although the explanations have been made for cases using an optical disk as a recording medium and cases using an optical disk device as a recording/recording means, it is obvious that the invention is applicable to any recording/reproducing apparatus with a physical access means regardless the type of recording medium including the magnetic and optical systems capable of the recording/reproducing of information. It is obvious also that any discrimination method of the managing information region or any allocation method of the temporary storage region is applicable to the host cache.

As explained above, the first embodiment of the invention is to dispose the temporary storage means into plural regions which are individually accessible, and the temporary storage managing means is to switch the allocation of the regions according to the result of the discrimination means discriminating the managing information region from the data region on the recording medium in order to store and to manage the paired data and its managing information in individually allocated regions of said temporary storage means.

By employing these, the data stored in the temporary storage means can be effectively utilized when the accesses are made through various operating systems, and the information stored in the temporary storage means can be utilized at the same time so that a substantial reduction in the frequency of accesses to the managing information and data regions on the recording medium and thus a higher processing speed can be obtained. In addition to these, by allocating high volume pages of temporary storage means to the data region to which a relatively long blocks are disposed, a higher utility of the temporary storage means can be realized.

Furthermore, the second embodiment of the invention is to provide a means dividing the temporary storage means arbitrarily, and allocating these to the regions of recording medium.

By employing this embodiment, the data stored in the temporary storage means can be effectively utilized in response to any access patterns made from various host apparatuses. And at the same time, by allocating the divided temporary storage regions to a fixed region on the recording medium, the access processing period of data on the temporary storage means can be reduced substantially. Moreover, by using a means specifying the allocation of said temporary storage region by a host apparatus and a means of its automatic allocation, a temporary storage means of higher efficiency matched to the host apparatus can also be obtained.

What is claimed is:

1. An information recording/reproducing apparatus for temporary storage of 1) data and 2) data managing information other than data comprising:

a recording medium recording and reproducing information in a unit of specified block;

said recording medium including a data region and a managing information region;

recording/reproducing means for recording information on said recording medium and for reproducing information from said recording medium;

interface means to a host apparatus;

temporary storage means for temporarily storing said data and said data managing information being exchanged with said host apparatus in performing recording and reproducing of said recording medium;

temporary storage region disposition means dividing said temporary storage means into at least two regions;

temporary storage region managing means for managing said divided regions individually as a data region containing said data or a managing information region containing said managing information for managing said data region; and discrimination means for determining a correspondence, of said block to be processed, to
a) said data region constituting a main file of said recording medium or
b) said managing information region of said recording medium indicating the locations and connections of said data region, said correspondence determined on the basis of
i) processes requested from said host apparatus,
ii) temporary storage managing information showing a utilization of said individual region of said temporary storage means, and
iii) the allocating information of said regions of said temporary storage means;

wherein said temporary storage region managing means allocates a region of said temporary storage means for using as a managing information region if the result of discrimination shows said managing information region, or allocates a region for using as a data region if the result of discrimination shows said data region.

2. An information recording/reproducing apparatus according to claim 1, wherein said discriminating means is provided with a means to determine the length of processes of recording and reproducing requested from said host apparatus, determines a managing information region if the result shows a length shorter than a predetermined length or determines a data region if the result shows a length longer than a predetermined length.

3. An information recording/reproducing apparatus according to claim 1, wherein said discriminating means determines a managing information region if a number of maximum logical block address in said recording/reproducing block of which process is requested from host apparatus is smaller than a number of minimum logical block address, or determines as a data region if a number of maximum logical block address in said recording/reproducing block of which process is requested from host apparatus is larger than a size of minimum logical block address in said recording/reproducing block.

4. An information recording/reproducing apparatus according to claim 1, wherein said discriminating means determines a managing information region if the difference between a number of minimum logical block address of the data stored in said temporary storage region which is determined as a data region among plural regions of said temporary storage means, and a number of maximum logical block address in said recording/reproducing block of which process is requested from host apparatus is positive and larger than a predetermined value, or determines a managing information region if said difference is negative, zero, or positive, provided that the positive is smaller than a predetermined value.

5. An information recording/reproducing apparatus according to claim 1, wherein said discriminating means determines a managing information region if a correspondence of address of the process requested from host apparatus to an address of managing information region of the recording medium is observed, or determines a data region if no correspondence of said address is observed.

6. An information recording/reproducing apparatus according to claim 1, wherein said discriminating means provided with a means to monitor the pattern of recording/reproducing requested from host apparatus, determines a data region if the number of recording/reproducing process requested from host apparatus is less than the predetermined length and made to a discontinuous region and is continuous to the data stored in said temporary storage region or if the difference between a number of maximum logical block address of the data region and a number of minimum logical block address in said requested address of which process is less than a predetermined value, and determines as a managing information region if the difference between a number of maximum logical block address of the data region and a number of minimum logical block address is more than a predetermined value.

7. An information recording/reproducing apparatus according to one of claims 1–6, wherein said temporary storage region disposition means conducts unequal division of temporary storage means allowing an allocation of region to the temporary storage region of data region larger than the managing information region, or conducts allowing an allocation of temporary storage means larger than that of managing information region among plural temporary storage means to a temporary storage means of data region.

8. An information recording/reproducing apparatus according to one of claims 1–6, wherein said temporary storage region disposition means is to divide further the region of managing information division of the temporary storage means into a plural divisions of more than one, or to provide further plural temporary storage means of more than one.

9. An information recording/reproducing apparatus according to one of claims 1–6, wherein said temporary storage region disposition means is to conduct an unequal division of said temporary storage means allocating a region to temporary storage region of data region larger than the temporary storage region of managing information region, or to allocate a larger temporary storage means for the data region than managing information region in plural temporary storage means, and said temporary storage region disposition means is to divide the disposition of temporary storage region of said temporary storage means further into plural divisions of more than one, or to provide plural temporary storage means of more than one.

10. An information recording/reproducing apparatus according to one of claims 1–6, wherein said temporary storage region managing information showing a disposition of each region of said temporary storage means provides starting logical block addresses, a number of stored blocks, and a control information showing the discrimination of either the reproduced data or the record requested data stored in each region.

11. An information recording/reproducing apparatus according to one of claims 1–6, wherein said temporary storage region disposition means is to divide said temporary storage means in unequal ratio disposing said data region larger than said managing information region, or to allocate a temporary storage means for data larger than that for managing information in plurally provided temporary storage means, and said temporary storage region managing information showing a disposition of each region of said temporary storage means provides starting logical block addresses, the number of stored blocks, and control information showing the discrimination of either the reproduced data or the record requested data, stored in each region.

12. An information recording/reproducing apparatus according to one of claims 1–6, wherein said temporary storage region disposition means is to divide the temporary storage region of said temporary storage means into plural regions of more than one, or to provide plural temporary storage means of more than one, and said temporary storage region managing information showing a disposition of each region of said temporary storage means provides starting logical block addresses of the data stored in each region, the number of stored blocks, and control information showing the discrimination of either the reproduced data or the record requested data.

13. An information recording/reproducing apparatus according to one of claims 1–6, wherein said temporary storage region disposition means is to divide the capacity of said temporary storage means in an unequal ratio disposing a larger region to the temporary storage region of data region than the region of managing information region, or to allocate a temporary storage means as the temporary storage means for data region in plurally provided temporary storage means larger than that of managing information region, and moreover, said temporary storage region disposition means changing the disposition of temporary storage region of said temporary storage means dividing the region of managing information region into plural regions of more than one or to provide plural temporary storage means of more than one, and the temporary storage region managing information showing the usage of each region of said temporary storage means provides starting logical block addresses of the data stored in each region, the number of stored blocks, and control information showing the discrimination of either the reproduced data or the record requested data.

14. An information recording/reproducing apparatus according to claim 1, wherein said temporary storage means employs one memory device for every one of said temporary storage regions, or one memory device for every one of said managing information regions or data regions.

15. An information recording/reproducing apparatus according to claim 1 further comprising a plurality of temporary storage region managing means.

16. An information recording/reproducing apparatus for temporary storage of 1) data and 2) data managing information other than data comprising:

- a recording medium recording/reproducing information in a unit of specified block;
- said recording medium including a data region and a managing information region;
- recording/reproducing means for recording information on said recording medium and for reproducing information from said recording medium;
- interface means to a host apparatus;
- temporary storage means for temporarily storing data being exchanged with said host apparatus in performing recording and reproducing of said recording medium;
- temporary storage region disposition means dividing said temporary storage means into at least two regions; and
- temporary storage region managing means for managing said divided regions individually as a data region containing said data or a managing information region containing said managing information for managing said data region;
- wherein one region or more than one region among said temporary storage means are allocated only to a specified region of said recording medium.

17. An information recording/reproducing apparatus according to claim 16, provided further with a means changing the division of said temporary storage region or allocation of divided regions to said recording medium according to an instruction made by a host apparatus.

18. An information recording/reproducing apparatus according to claim 16, wherein said temporary storage region managing means selects automatically a division of said temporary storage regions and allocation to the recording medium among specified allocation methods according to either a host apparatus or user.

19. An information recording/reproducing apparatus according to claim 18, wherein said temporary storage region managing means performs an automatic alternation of the division of said temporary storage means and allocation to the recording medium in a case where the number of accesses to a region on said recording medium region made to a region of divided temporary storage means is less than a predetermined value and at the same time, the number of accesses to a region different from said region on said recording medium is more than a predetermined value.

20. An information recording/reproducing apparatus according to claim 18, wherein said temporary storage region managing means performs an automatic alternation of the division of said temporary storage means and the allocation to the recording medium in a case where the ratio of the number of accesses to a region on said recording medium region made to a region of divided temporary storage means to the total number of accesses is less than a predetermined value and at the same time, the ratio of the number of accesses to a region different from said region on said recording medium to the total number of accesses is more than a predetermined value.

21. An information recording/reproducing apparatus according to one of claims 16–20, provided further with a means to read a data on said recording medium allocated to said divided temporary storage means into a corresponding temporary storage region at a arbitrary timing determined before a readout request from a host apparatus is made.

* * * * *